United States Patent
Yamawaki (10) Patent No.: US 6,930,812 B2
(45) Date of Patent: Aug. 16, 2005

(54) MULTI-BEAM LIGHT SCANNING OPTICAL SYSTEM AND IMAGE FORMING APPARATUS USING SAME

(75) Inventor: Takeshi Yamawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 10/255,692

(22) Filed: Sep. 27, 2002

(65) Prior Publication Data

US 2003/0085346 A1 May 8, 2003

(30) Foreign Application Priority Data

Sep. 27, 2001 (JP) .................................. 2001-297018

(51) Int. Cl.⁷ .............................................. G02B 26/08
(52) U.S. Cl. .................... 359/204; 359/216; 347/241; 347/243
(58) Field of Search ................. 359/204, 738–740; 347/233–235, 243, 244

(56) References Cited

U.S. PATENT DOCUMENTS

| | | | |
|---|---|---|---|
| 5,748,223 A | 5/1998 | Ito | 347/241 |
| 5,970,034 A | 10/1999 | Sakuma et al. | 369/44.38 |
| 5,999,345 A * | 12/1999 | Nakajima et al. | 359/821 |
| 6,133,566 A | 10/2000 | Yamaguchi | 250/234 |
| 6,178,029 B1 | 1/2001 | Kamikubo | 359/204 |
| 6,775,041 B1 * | 8/2004 | Nakajima | 359/204 |
| 2002/0163703 A1 * | 11/2002 | Ishibe | |

FOREIGN PATENT DOCUMENTS

| | | |
|---|---|---|
| EP | 589700 | 3/1994 |
| EP | 843192 | 5/1998 |
| EP | 903929 | 3/1999 |
| JP | 11-84283 | 3/1999 |
| WO | 00/20912 | 4/2000 |

* cited by examiner

*Primary Examiner*—James Phan
(74) *Attorney, Agent, or Firm*—Fitzpatrick, Cella, Harper & Scinto (57) ABSTRACT

A multi-beam light scanning optical system includes n (n≥2) light source means having m (m≥2) light emitting points; beam synthesizing means for synthesizing n×m light beams emitted by the light source means; deflecting means for deflecting n×m light beams from the beam synthesizing means; an imaging optical system for imaging the n×m light beams from the deflecting means on a surface to be scanned, wherein the surface to be scanned is scanned in a main scan direction with n×m light beams by a deflection scanning operation of the deflecting means; an aperture stop provided between the beam synthesizing means and the deflecting means, wherein principal rays of the n×m light beams are intersected at a position of the aperture stop, and the light beams which are adjacent to each other in a sub-scan direction on the surface to be scanned are the beams emitted from different ones of the light source means.

16 Claims, 6 Drawing Sheets

MULTI-BEAM LIGHT SCANNING OPTICAL SYSTEM AND IMAGE FORMING APPARATUS USING SAME

FIELD OF THE INVENTION AND RELATED ART

The present invention relates to a multi-beam light scanning optical system and an image forming apparatus using the same, more particularly to a multi-beam light scanning optical system capable of high speed light scanning of a surface using a plurality of light source means, particularly suitable for an image forming apparatus such as a laser beam printer, a digital copying machine, a multi-function printer or the like.

A light scanning optical system is widely used as a writing optical system for a laser beam printer, a digital copying machine, a multi-function printer or the like, and there is a demand for high image quality and high speed scan in order to raise the scanning speed, it is considered to increase the number of surfaces of the polygonal mirror (light deflector) or to raise the rotational frequency of the polygonal mirror to 2 times, 3 times or even higher, but such a simple change of the optical factors imparts too high load on t polygonal mirror motor, and therefore, reaches the performance limit immediately.

Various approaches have been proposed for the high speed. For example, Japanese Laid-open Patent Application Hei 11 84283 discloses a multi-beam scanning type in which a parallel line scanning is carried out using n light beams, by which the speed becomes n times without changing the rotational frequency of the light deflector.

Furthermore, in the proposal, the use is made with m light sources each having n emitting points, and the n×m light beams are emitted substantially same direction by beam synthesizing means (complex prism), by which n×m beams are used. By this beam synthesizing means, the n×m beams have predetermined angle θB relative to each other in the plane from which they are emitted, and the plane in which the n×m beams exist is inclined at a predetermined angle relative to t main scan direction about the optical axis at the entrance side, so that light beams are incident on the scanning line.

By doing so, the light beams emergent from m light sources can be disposed in an interraced manner, so that expansion of the light beam can be suppressed as compared with one array laser having n×m emitting points, and therefore, the size of the rotatable polygonal mirror and the optical elements may not be increased.

In addition, the collimator lens and the beam synthesizing means are unified into a light source apparatus, and the unit is adjusted by rotating about the optical axis thereof to accomplish a high precision adjustment of the clearance between scanning lines.

SUMMARY OF THE INVENTION

Figure 6:
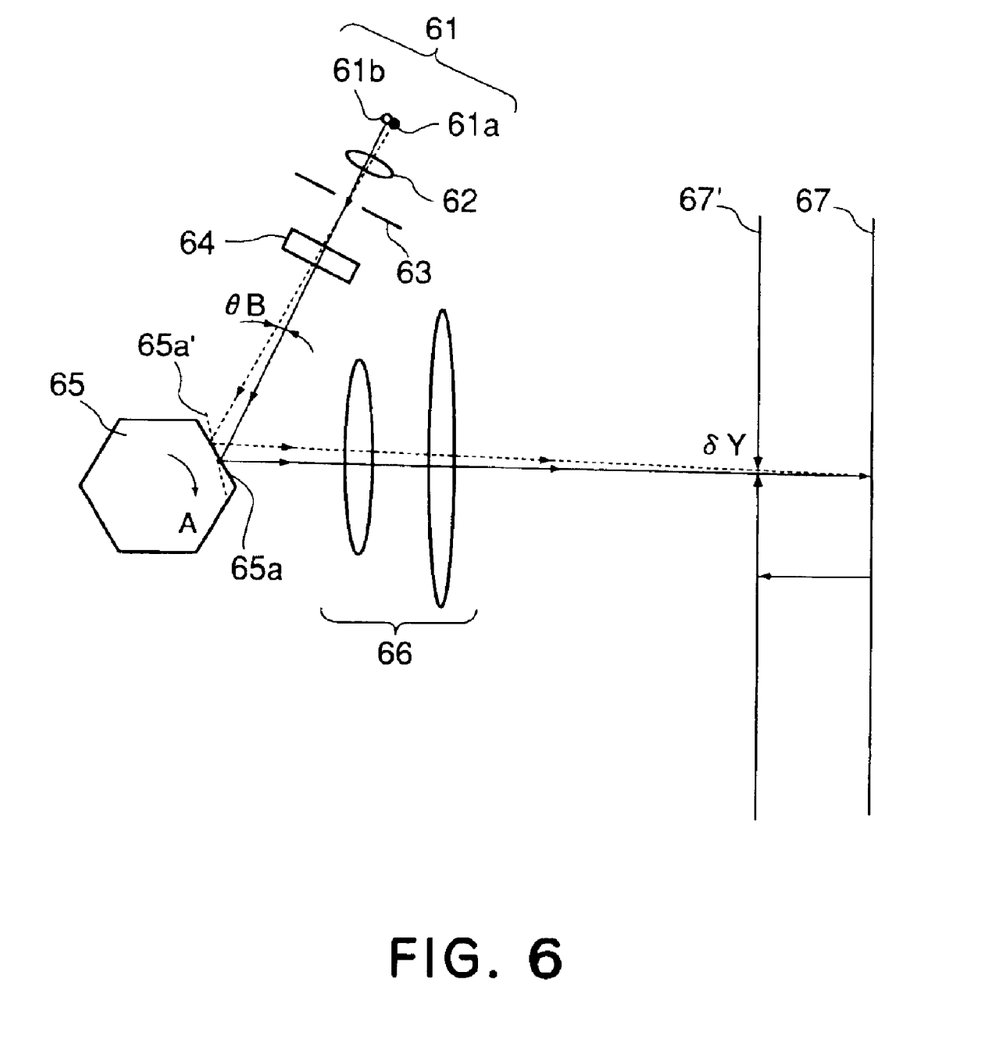
FIG. 6 illustrates a principle of defocus in the main scan direction.

However, the method described above is not sufficient to confine the expansion of the light beam in the main scan direction on the polygonal mirror surface. In the multi-beam light scanning optical system, the consideration is to be paid to the generation of the jittering attributable to defocusing in the main scan direction. Referring to FIG. 6, the principle will be described.

FIG. 6 is a main-scanning section view of a conventional multi-beam light scanning optical system. For simplicity of explanation, a light source 61 has two emitting points 61a, 61b.

The two beams emitted from the light source 61 are incident on a deflection surface (reflection surface) 65a of the polygonal mirror (light deflector) 65 at an angle θR therebetween in the main scan direction. The principal rays of the light beams intersect with each other at the position of an aperture stop 63 disposed immediately after the collimator—lens 62, but they are spaced apart from each other on the deflection surface 65a and are reflected at positions different from each other in the main scan direction. In order to image the beam at the same image height position on the surface to be scanned 67, the deflection angle (polygonal mirror angle) deflecting the light beams are different by θ B/2 in the phase as indicated by 65a, and therefore, there is an angle difference in the main scan direction between the beams at the same image height positions. If a defocusing occurs in the main scan direction for one reason or another (in the example of FIG. 6, the surface to be scanned 67 is deviated to a position 67), a deviation δY of the imaging position results in the main scan direction as shown in FIG. 6.

When n×m light beams emitted from m light sources each having n emitting points are synthesized by the beam synthesizing means, the generation of the jittering can be explained by considering a maximum angle between the light beam and t main scan direction as being θB. Namely, the angle θB increases in proportion to the number of the light beams to be synthesized, and the deviation δY increases in proportion to the angle θR.

The conventional structures involve a problem that deviation of the imaging positions of the beams result in the deteriorations of the printing precision and the image quality.

The defocusing in the main scan direction is caused by various factors; for example, imaging performance of the optical parts, positional accuracy between the parts or the like, which cannot be completely removed. Accordingly, it is very difficult to prevent the deteriorations of the printing precision, the image quality or the like attributable to the deviation of the imaging positions of the multiple beams.

Accordingly, it is a principal object of the present invention to provide a multi-beam light scanning optical system and an image forming apparatus in which a deviation, on a surface to be scanned, of an imaging position of multiple beams emitted from multiple light source means is reduced to provide a satisfactory printing precision and image quality.

According to an aspect of the present invention, there is provided (1) a multi-beam light scanning optical system comprising:

n (n≧2) light source means having m (m≧2) light emitting points;

beam synthesizing means for synthesizing n×m light beams emitted by said light source means;

deflecting means for deflecting n×m light beams from said beam synthesizing means;

an imaging optical system for imaging the n×m light beams from said deflecting means on a surface to be scanned, wherein the surface to be scanned is scanned in a main scan direction with n×m light beams by a deflection scanning operation of the deflecting means;

an aperture stop provided between said beam synthesizing means and said deflecting means, wherein principal rays of the n×m light beams are intersected at a position of said aperture stop, and the light beams which are adjacent to each other in a sub-scan direction on the surface to be scanned are the beams emitted from different ones of said light source means.

According to another aspect of the present invention, there is provided (2) a multi-beam light scanning optical system according to aspect 1, further comprising a coupling lens provided for each of said m light source means, said coupling lens directs the light beams emitted from said n emitting points toward said beam synthesizing means.

According to a further aspect of the present invention, there is provided (3) a multi-beam light scanning optical system according to aspect 1, further comprising optical means for converting the n×m light beams to line images extending in the main scan direction on or adjacent a deflection surface of said deflecting means.

According to a further aspect of the present invention, there is provided (4) a multi-beam light scanning optical system according to aspect 3, wherein said aperture stop is disposed between said optical means and said deflecting means, and a distance Lh, measured in a direction of an optical axis from said optical means to a light reflection point on the deflection surface of said deflecting means and a distance Lp, measured in the optical direction, from said optical means to said aperture stop, satisfy:

$$Lh/2 < Lp.$$

According to a further aspect of the present invention, there is provided (5) a multi-beam light scanning optical system according to aspect 3, wherein a width, measured in the main scan direction, of the light beam emitted from said optical means is larger than a width, measured in the main scan direction, of the deflection surface of said deflecting means.

According to a further aspect of the present invention, there is provided (6) a multi-beam light scanning optical system comprising:

a first light source means having two light emitting points;

a second light source means having one light emitting point;

beam synthesizing means for synthesizing three light beams emitted by said first and second light source means;

deflecting means for deflecting three light beams from said beam synthesizing means;

an imaging optical system for imaging the three light beams from said deflecting means on a surface to be scanned, wherein the surface to be scanned is scanned in a main scan direction with three light beams by a deflection scanning operation of the deflecting means;

an aperture stop provided between said beam synthesizing means and said deflecting means, wherein principal rays of the three light beams are intersected at a position of said aperture stop, and the light beams which are adjacent to each other in a sub-scan direction on the surface to be scanned are the beams emitted from different ones of said light source means.

According to a further aspect of the present invention, there is provided (7) a multi-beam light scanning optical system according to aspect 6, further comprising a coupling lens provided for each of said first and second source means, said coupling lens directs the light beams emitted from said emitting points of said light source means toward said beam synthesizing means.

According to a further aspect of the present invention, there is provided (8) ? a multi-beam light scanning optical system according to aspect 6, further comprising optical means for converting the three light beams to line images extending in the main scan direction on or adjacent a deflection surface of said deflecting means.

According to a further aspect of the present invention, there is provided (9) a multi-beam light scanning optical system according to aspect 8, wherein said aperture stop is disposed between said optical means and said deflecting means, and a distance Lh, measured in a direction of an optical axis from said optical means to a light reflection point on the deflection surface of said deflecting means and a distance Lp, measured in the optical direction, from said optical means to said aperture stop, satisfy:

$$Lh/2 < Lp.$$

According to a further aspect of the present invention, there is provided (10) a multi-beam light scanning optical system according to aspect 3, wherein a width, measured in the main scan direction, of the light beam emitted from said optical means is larger than a width, measured in the main scan direction, of the deflection surface of said deflecting means.

According to a further aspect of the present invention, there is provided (11) a multi-beam light scanning optical system comprising;

n (n≧2) light source means having m (m≧2) light emitting points;

beam synthesizing means for synthesizing n×m light beams emitted by said light source means;

deflecting means for deflecting n×m light beams from said beam synthesizing means;

an imaging optical system for imaging the n×m light beams from said deflecting means on a surface to be scanned, wherein the surface to be scanned is scanned in a main scan direction with n×m light beams by a deflection scanning operation of the deflecting means, wherein a width, measured in the main scan direction, of the light beam emitted from said optical means and incident on the deflection surface is larger than a width, measured in the main scan direction, of the deflection surface of said deflecting means, and the light beams which are adjacent to each other in a sub-scan direction on the surface to be scanned are the beams emitted from different ones of said light source means.

According to a further aspect of the present invention, there is provided (12) a multi-beam light scanning optical system comprising:

a first light source means having two light emitting points;

a second light source means having one light emitting point;

beam synthesizing means for synthesizing three light beams emitted by said first and second light source means;

deflecting means for deflecting three light beams from said beam synthesizing means:

an imaging optical system for imaging the three light beams from said deflecting means on a surface to be scanned, wherein the surface to be scanned is scanned in a main scan direction with three light beams by a deflection scanning operation of the deflecting means;

wherein a width, measured in the main scan direction, of the light beam emitted from said optical means and incident on the deflection surface is larger than a width, measured in the main scan direction, of the deflection surface of said deflecting means, and the light beams which are adjacent to each other in a sub-scan direction on the surface to be scanned are the beams emitted from different ones of said light source means.

According to a further aspect of the present invention, there is provided (13) a multi-beam light scanning optical system according to aspect 1, wherein a clearance D, measured in the main scan direction, of the emitting point, a focal length $f_{col}$ of said coupling lens, a distance L1 from said aperture stop to the deflection surface of said deflecting means, and a focal length $f_{f\theta}$, measured in the main scan direction, of said imaging optical system, and a recording density DPI, in the main scan direction, on the surface to be scanned, satisfy:

$$(D \times L_1)/(f_{col} \times f_{f\theta}) \leq (25.4/DPI) \times (1/4).$$

According to a further aspect of the present invention, there is provided (14) a multi-beam light scanning optical system according to aspect 6, wherein a clearance D, measured in the main scan direction, of the emitting point, a focal length $f_{col}$ of said coupling lens, a distance L1 from said aperture stop to the deflection surface of said deflecting means, and a focal length $f_{f\theta}$, measured in the main scan direction, of said imaging optical system, and a recording density DPI, in the main scan direction, on the surface to be scanned, satisfy:

$$(D \times L_1)/(f_{col} \times f_{f\theta}) \leq (25.4/DPI) \times (1/4).$$

According to a further aspect of the present invention, there is provided (15) a multi-beam light scanning optical system according to aspect 11, wherein a clearance D, measured in the main scan direction, of the emitting point, a focal length $f_{col}$ of said coupling lens, a distance L1 from said aperture stop to the deflection surface of said deflecting means, and a focal length $f_{f\theta}$, measured in the main scan direction, of said imaging optical system, and a recording density DPI, in the main scan direction, on the surface to be scanned, satisfy:

$$(D \times L_1)/(f_{col} \times f_{f\theta}) \leq (25.4/DPI) \times (1/4).$$

According to a further aspect of the present invention, there is provided (16) a multi-beam light scanning optical system according to aspect 12, wherein a clearance D, measured in the main scan direction, of the emitting point, a focal length $f_{col}$ of said coupling lens, a distance L1 from said aperture stop to the deflection surface of said deflecting means, and a focal length $f_{f\theta}$, measured in the main scan direction, of said imaging optical system, and a recording density DPI, in the main scan direction, on the surface to be scanned, satisfy:

$$(D \times L_1)/(f_{col} \times f_{f\theta}) \leq (25.4/DPI) \times (1/4).$$

According to a further aspect of the present invention, there is provided (17) an image forming apparatus comprising a multi-beam light scanning optical system as defined in aspect 1, said apparatus further comprising a photosensitive member disposed at the position of said surface to be scanned, a developing device for developing, into a toner image, an electrostatic latent image formed on said photosensitive member by light rays deflected by said multi-beam light scanning optical system, a transfer device for transferring the toner image onto a transfer material, and a fixing device for fixing the toner image transferred onto the transfer material thereon.

According to a further aspect of the present invention, there is provided (18) an image forming apparatus comprising a multi-beam light scanning optical system as defined in aspect 1, said apparatus further comprising a printer controller for converting code data supplied form an external device to an image signal and for supplying the converted data to said multi-beam light scanning optical system.

According to a further aspect of the present invention, there is provided (19) an image forming apparatus comprising a multi-beam light scanning optical system as defined in aspect 6, said apparatus further comprising a photosensitive member disposed at the position of said surface to be scanned, a developing device for developing, into a toner image, an electrostatic latent image formed on said photosensitive member by light rays deflected by said multi-beam light scanning optical system, a transfer device for transferring the toner image onto a transfer material, and a fixing device for fixing the toner image transferred onto the transfer material thereon.

According to a further aspect of the present invention, there is provided (20) an image forming apparatus comprising a multi-beam light scanning optical system as defined in aspect 6, said apparatus further comprising a printer controller for converting code data supplied form an external device to an image signal and for supplying the converted data to said multi-beam light scanning optical system.

According to a further aspect of the present invention, there is provided (21) an image forming apparatus comprising a multi-beam light scanning optical system as defined in aspect 11, said apparatus further comprising a photosensitive member disposed at the position of said surface to be scanned, a developing device for developing, into a toner image, an electrostatic latent image formed on said photosensitive member by light rays deflected by said multi-beam light scanning optical system, a transfer device for transferring the toner image onto a transfer material, and a fixing device for fixing the toner image transferred onto the transfer material thereon.

According to a further aspect of the present invention, there is provided (22) an image forming apparatus comprising a multi-beam light scanning optical system as defined in aspect 11, said apparatus further comprising a printer controller for converting code data supplied form an external device to an image signal and for supplying the converted data to said multi-beam light scanning optical system.

According to a further aspect of the present invention, there is provided (23) an image forming apparatus comprising a multi-beam light scanning optical system as defined in aspect 12 said apparatus further comprising a photosensitive member disposed at the position of said surface to be scanned, a developing device for developing, into a toner image, an electrostatic latent image formed on said photosensitive member by light rays deflected by said multi-beam light scanning optical system, a transfer device for transferring the toner image onto a transfer material, and a fixing device for fixing the toner image transferred onto the transfer material thereon.

According to a further aspect of the present invention, there is provided (24) an image forming apparatus comprising a multi-beam light scanning optical system as defined in aspect 12, said apparatus further comprising a printer controller for converting code data supplied form an external device to an image signal and for supplying the converted data to said multi-beam light scanning optical system.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS (Embodiment 1)

Figure 1:
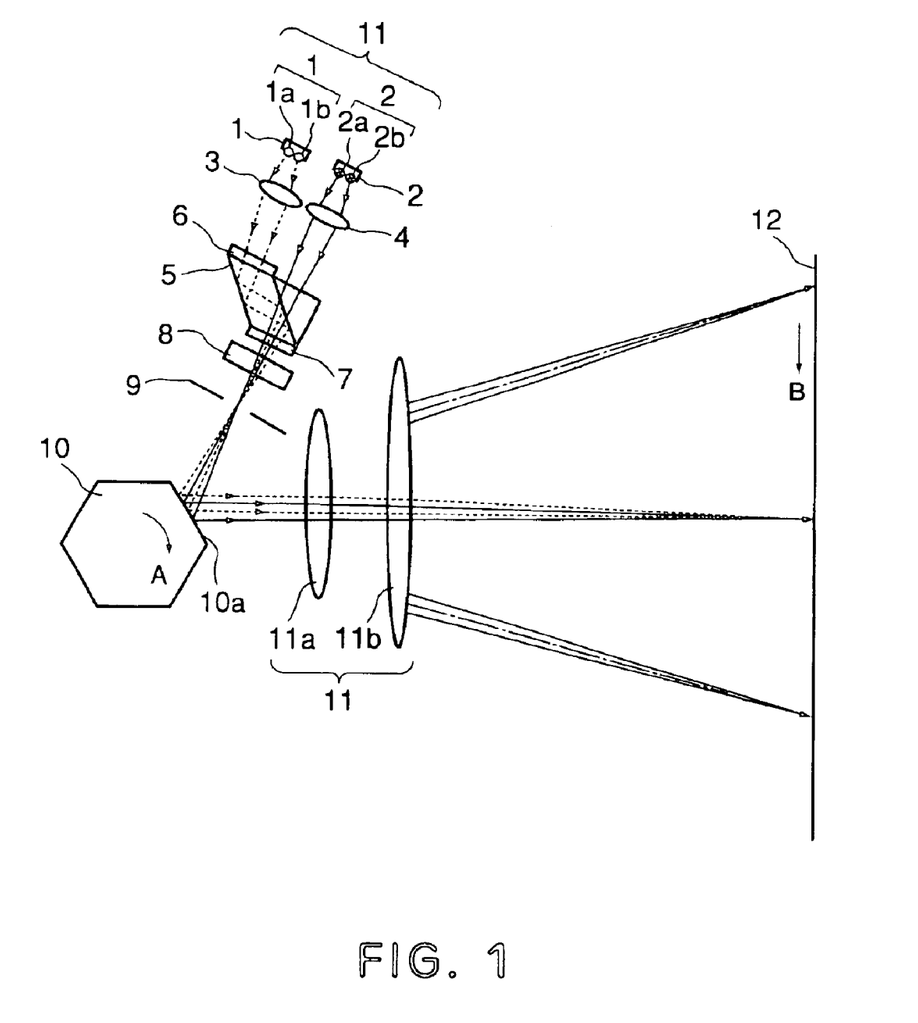
FIG. 1 is a main-scanning section view of a multi-beam light scanning optical system according to Embodiment 1 of the present invention.

FIG. 1 is a sectional view (main-scanning section view) of a major part of a multi-beam scanning optical system according to Embodiment 1 of the present invention.

In this specification, a main-scanning section is a view of a plane including an optical axis of an imaging optical system and a light beam (ray) deflected by the light deflector, and a sub-scan section is a view of a plane including an optical axis of the imaging optical system and perpendicular to the main-scanning section.

In this Figure, designated by 11 is a light source apparatus comprising first and second light source means 1, 2; the first light source means 1 includes two emitting points 1a, 1b, and the second light source means 2 includes two emitting points 2a, 2b, too.

3, 4 designated by reference numerals 3, 4 are coupling lenses (collimator lenses) disposed corresponding to the first and second light source means 1, 2 to convert the four beams emitted from the first and second light source means 1, 2 to a focal light beams (or substantially converging beams, or substantially diverging light beams) and to direct them to a beam synthesizing means 5 which will be described hereinafter.

In this embodiment, the light source apparatus 11 comprises two light source means 1, 2, namely the first and second light source means 1, 2, but it may comprises three or more light source means, and the first and/or second light source means may includes three or more emitting points.

Designated by 5 is beam synthesizing means comprising a complex prism constituted by a plurality of prisms. It is provided on a surface on which the light beam is incident from the first light source means 1 with a half-wave plate 6, and is provided on an inside surface with a polarization beam splitter surface, and it is further provided on an emergent surface with a quarter-wave plate 7.

The half-wave plate 6 converts the polarizing direction of the beam emergent from the first light source means 1 to a linear polarization light ((P polarization) in the plane of the sheet of the drawing of this Figure. The polarization beam splitter surface functions to reflects the linear polarization light (S polarization) perpendicular to the sheet of the drawing, and transmits the linearly polarized light (P polarization) in the sheet of the drawing. The quarter wave plate 7 converts the two polarized beams having different 90° polarizing directions synthesized by the beam synthesizing means 5 to respective circularly polarized light beams (left-hand circular polarization and right-hand circular polarization). By the conversion of the two linear polarized beams having different polarizing directions, the reflectance difference of the optical part due to the difference in the polarizing direction, can be eliminated, thus accomplishing uniform light quantities of the scanning beams.

In this embodiment, the polarizing directions of the two light beams incident from the first light source means 1 are rotated by 90°, and the two light beams are reflected by the polarization beam splitter surface, so that they are synthesized with the two light beams incident from t second light source means 2.

Designated by 8 is an optical means, more particularly, a cylindrical lens having predetermined refracting power only in the sub-scan direction to focus the four beams emergent from the beam synthesizing means 5 on the deflection surface (reflection surface) 10a of the light deflector 10 (deflecting means) or on the neighborhood thereof, in the form of a line image extending in the main scan direction.

Designated by 9 is an aperture stop is disposed adjacent the deflection surface 10a of the light deflector 10 in the optical path between the cylindrical lens 8 and the light deflector 10 such that condition expression (1) which will be described hereinafter is satisfied. By the provision of the aperture stop 9, an expansion of the four beams in the main scan direction in the deflection plane of the light deflector 10 can be confined, so that deflection plane is not enlarged.

In this embodiment, the principal rays of the four beams emergent from the first and second light source means 1, 2 intersect at the position of the aperture stop 9, so that light beams adjacent in the sub-scan direction on the surface to be scanned 12 are the beams emitted from the different light source means.

Designated by 10 is a light deflector as a deflecting means, which includes, for example, rotatable polygonal mirror (polygonal mirror) having six reflecting surfaces. It is rotated at a constant speed in the direction indicated by an arrow An in the Figure by a driving means such as a motor (unshown).

Designated by 11 is an imaging optical system (scanning lens system) having a condensing function and a f-θ property. It comprises two lenses, namely, first and second scanning lenses 11a, 11b which function to image the light beam modulated in accordance with image information and having been subjected to reflection deflection of the light deflector 10, on a photosensitive drum surface 12 (surface to be scanned) and which provides a conjugate relation in the sub-scan section between the deflection plane 10a of the light deflector 10 and the photosensitive drum surface 12, by which tilting of the beam is corrected.

In this embodiment, the four beams having been subjected to the light modulation in accordance with the image information and emitted from the first and second light source means 1, 2 are converted to a substantially parallel light beams (or substantially converging beam, or substantially diverging light beam) by the associated coupling lenses 3, 4, and are synthesized by a beam synthesizing prism 5 such that they are emitted substantially the same directions. The four substantially parallel beams synthesized by the beam synthesizing prism 5 are incident on the cylindrical lens 8. The light beams incident on the cylindrical lens 8 are emergent are emergent without change in the main-scanning plane and transmit through the aperture stop 9 (partly blocked). In the sub-scan plane, the beams are converged and transmitted through the aperture stop 9 (partly blocked), so that they are formed into line images (extending in the main scan direction) on the deflection surface 10a of the light deflector 10. The four beams having been subjected to the reflection deflection by the deflection surface 10a of the light deflector 10, are imaged as spots on the photosensitive drum surface 12 by the respective 11. By rotating the light deflector 10 in the direction indicated by arrow An in the Figure, the photosensitive drum surface 12 is scanned optically in the direction (main scan direction) indicated by an arrow B at a constant speed. By doing so, the photosensitive drum surface 12 (recording material) is simultaneously scanned with the four scanning beams to carry out image recording.

In this embodiment, the beam synthesizing prism 5 synthesizes the beam such that one of the principal rays of the beams emitted from the second light source means 2 is within the angle formed between the principal rays of the two light beams emitted from the first light source means 1, by which the four light beams are intersected in an interraced manner in the main-scanning plane at the position of the aperture stop 9. By the synthesization in this manner (interraced intersection), the expansion of the four light beams in the deflection plane 10a in the main scan direction, can be sufficiently suppressed, so that jittering attributable to the defocusing in the main scan direction can be reduced.

Figure 2:
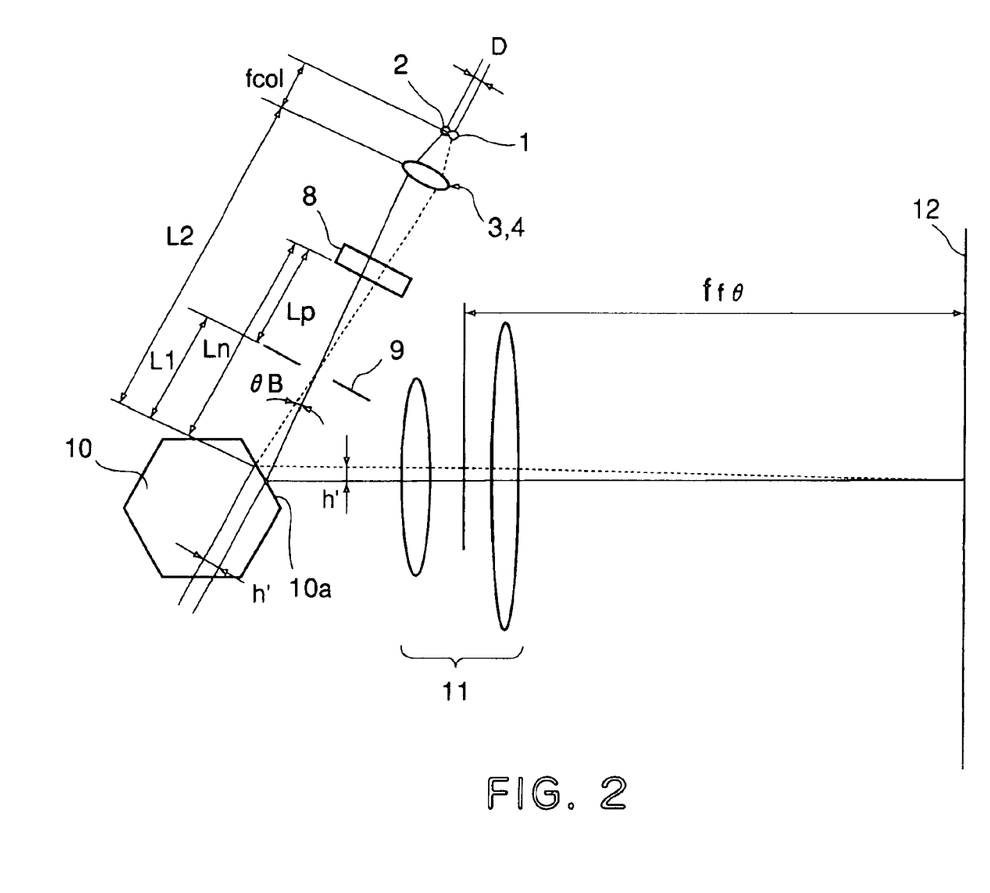
FIG. 2 is a view illustrating a condition expression of defocus in the main scan direction.

FIG. 2 illustrates a dispositional condition of the aperture stop in this embodiment. In this Figure, the same reference numerals as in FIG. 1 are assigned to the elements having the corresponding functions.

The description will be made as to how condition expression (2) results. In FIG. 2, the light source means 1, 2 have only one emitting points, respectively, for simplicity, and the condition expression (2) is explained with two beams. Additionally, the beam synthesizing means 5, the half-wave plate 6 and the quarter-wave plate 7 are omitted for simplicity of explanation.

In this Figure, parameters are set such that when a distance, measured in the direction of the optical axis from the cylindrical lens 8 to the light reflection point on the deflection surface 10a of the light deflector 10 is Lb, and a distance, measured in the direction of the optical axis from the cylindrical lens 8 to the aperture stop 9, the following is satisfied:

$$Lh/2 < Lp \qquad (1)$$

By doing so, the distance h' between the principal rays of the two light beams (emitted from the first and second light source means 1, 2) on the deflection surface 10a can be reduced.

The parameters are set such that when a distance, measured in the main scan direction, of the emitting points of the first and second light source means 1, 2 as seen from the surface to be scanned, is D, a focal length of the cylindrical lens 8 is $f_{col}$, a distance from the aperture stop 9 to the deflection surface 10a of the light deflector 10 is L1, a focal length of the imaging optical system 11 in the main scan direction is $f_{f\theta}$, and a light deflector 10 on the surface to be scanned in the main scan direction is DPI, the following is satisfied:

$$(D \times L_1)/(f_{col} \times f_{f\theta}) \leq (25.4/DPI) \times (\tfrac{1}{4}).$$

By doing so, in this embodiment, a deviation of the imaging positions of the light beam×from the two light source means 1, 2, is suppressed.

The description will be made as to the technical significance of the condition expression (2).

When the aperture stop 9 is disposed at a position between the cylindrical lens 8 and the light deflector 10 as shown in FIG. 2, the distance h' between the principal rays of the two beams on the deflection surface 10a is as follows, since the angle formed between the two beams emergent from the coupling lens (3 and 4) has to be constant:

$$h'(D/\times f_{col}) \times L1$$

The angle between two beams emergent from the imaging optical system 11 is:

$$h'/f_{f\theta}"(D \times L1)/(f_{col} \times f_{f\theta})$$

Thus, it is a deviation δY between the imaging positions of the two beams in the case of 1 mm defocus in the main scan direction.

In this embodiment, the elements are set such that said condition expression (2) is satisfied, such that amount δY is not more than ¼ pixel in the recording density, which is a tolerable range. By this, a satisfactory image is provided.

Thus, in this embodiment, the aperture stop 9 is disposed at a specific position, and the four light beams emitted from the first and second light source means 1, 2 are interraced, so that maximum angle θB of the four beams with respect to the main scan direction is reduced, by which the jittering due to the defocusing in the main scan direction is reduced.

Moreover, in this embodiment, the elements are set such that said condition expression (1) and/or the condition expression (2) is satisfied, by which the deviation of the imaging positions of the plurality of beams can be reduced, thus accomplishing a satisfactory printing precision and high image quality.

If the beam conversion by the coupling lenses 3, 4 provides a substantially converging beam or a substantially divergent light, a jittering in the main scan direction is produced by the deflection scanning. However, by selecting such a direction that it offsets the multi-beam jittering produced upon the beam being incident on the surface of the photosensitive drum at a predetermined angle in the sub-scan direction, the total jittering in the case of the multi-beam can be reduced.

In this embodiment, four beams emitted from two light source means each having two emitting points are synthesized, but the example can be generalized into synthesization of a plurality of beams emitted from m (m≧2) light source means each having n (n≧2) emitting points.

(Embodiment 2)

Figure 3:
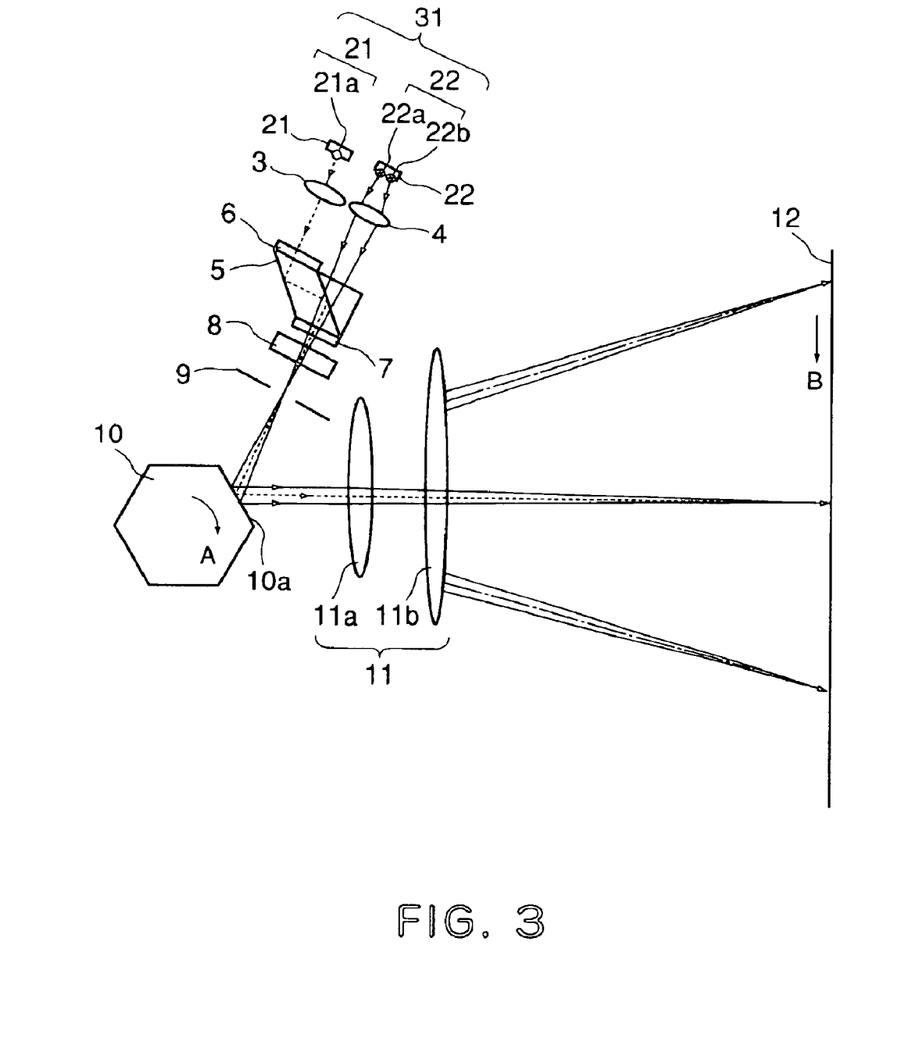
FIG. 3 is a main-scanning section view of a multi-beam light scanning optical system according to Embodiment 2 of the present invention.

FIG. 3 is a sectional view (main-scanning section view) of a major part in the main scan direction of a multi-beam light scanning optical system according to Embodiment 2. In this Figure, the same reference numerals as in FIG. 1 are assigned to the elements having the corresponding functions.

This embodiment is different from the Embodiment 1 in that light source apparatus 31 comprises a first light source means 21 having one emitting point 21a and a second light source means 22 having two emitting points 22a, 22b. The other structures and optical functions are substantially the same as with Embodiment 1, and the similar effect are provided.

In the Figure, designated by 31 is a light source apparatus which comprises first light source means 21 having one emitting point 21a and second light source means 22 having two emitting points 22a, 22b.

The beam synthesizing means is constructed such that principal ray of the light beam emitted from the first light source means 21 is within an angle formed between two principal rays of the light beams emitted from the second light source means 22. By doing so, in this embodiment, expansions of the three beams on the deflection surface 1a of the light deflector 10 can be suppressed, so that jittering resulting from defocusing can be reduced. The effect provided by the position of the aperture stop 9 is similar to that in Embodiment 1.

The effect of the conversion to the substantially converging beam or to the diverging light beam by the coupling lenses 3, 4 is the same as with Embodiment 1, and the jittering can be offset by the jittering produced by the incident angle of the light beam on the surface 12 of the photosensitive drum.

(Embodiment 3)

Figure 4:
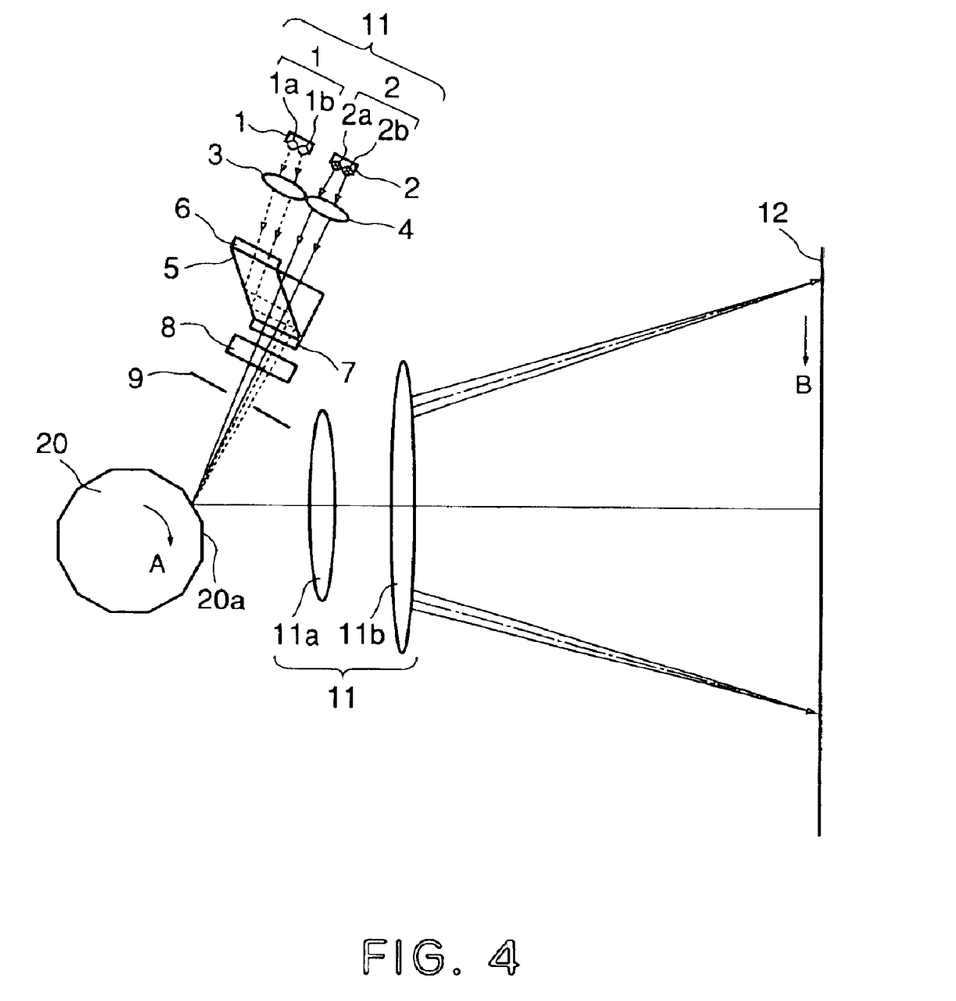
FIG. 4 is a main-scanning section view of a multi-beam light scanning optical system according to Embodiment 3 of the present invention.

FIG. 4 is a sectional view (main-scanning section view) of a major part in the main scan direction of a multi-beam light scanning optical system according to Embodiment 2. In this Figure, the same reference numerals as in FIG. 1 are assigned to the elements having the corresponding functions.

This embodiment is different from Embodiment 1 in that multi-beam light scanning optical system is constructed by an over-field scanning optical system. The other structures and optical functions are substantially the same as with Embodiment 1, and the similar effect are provided.

Four light beams are incident on the deflection surface 20a of the light deflector 20 having 12 surfaces, astride a plurality of deflection surfaces in the main-scanning section (the light beam has a width larger than the width of the deflection surface 20a measured in the main scan direction), and therefore, the width of the deflection surface 20a In the main scan direction functions as an aperture stop in effect. The scanning optical system having such a relation between the incident beam and the deflection surface is called "over-field scanning optical system".

When a plurality of light beams emitted from a plurality of light source means are synthesized by beam synthesizing means (complex prism) and are incident on the deflection surface with predetermined angle differences in the main-scanning plane in the case of the over-field scanning optical system, the light beams have to intersect at one point on the deflection plane. The beams intersecting at one point in the deflection plane, are deflected with a predetermined phase difference. However, since the reflection points are common, the principal rays of the light beams directing toward the imaging optical system reach the same image height positions on the surface to be scanned through the same optical path. For this reason, the jittering due to the defocusing in the main scan direction is not produced in principle. The deflection surfaces provide ideal dispositions of the aperture stops.

In this embodiment, as described hereinbefore, the four beams emitted from the first and second light source means 21, 22 are incident astride the plurality of deflection surfaces, by which the jittering attributable to the defocusing in the main scan direction can be eliminated in principle.

(Embodiment 4)

The description will be made as to Embodiment 4 of the multi-beam light scanning optical system according to the present invention.

This embodiment is different from Embodiment 2 in that multi-beam light scanning optical system is constructed by an over-field scanning optical system. The other structures and optical functions are substantially the same as with Embodiments 2 and 3, and the similar effect are provided.

(Image Forming Apparatus)

Figure 5:
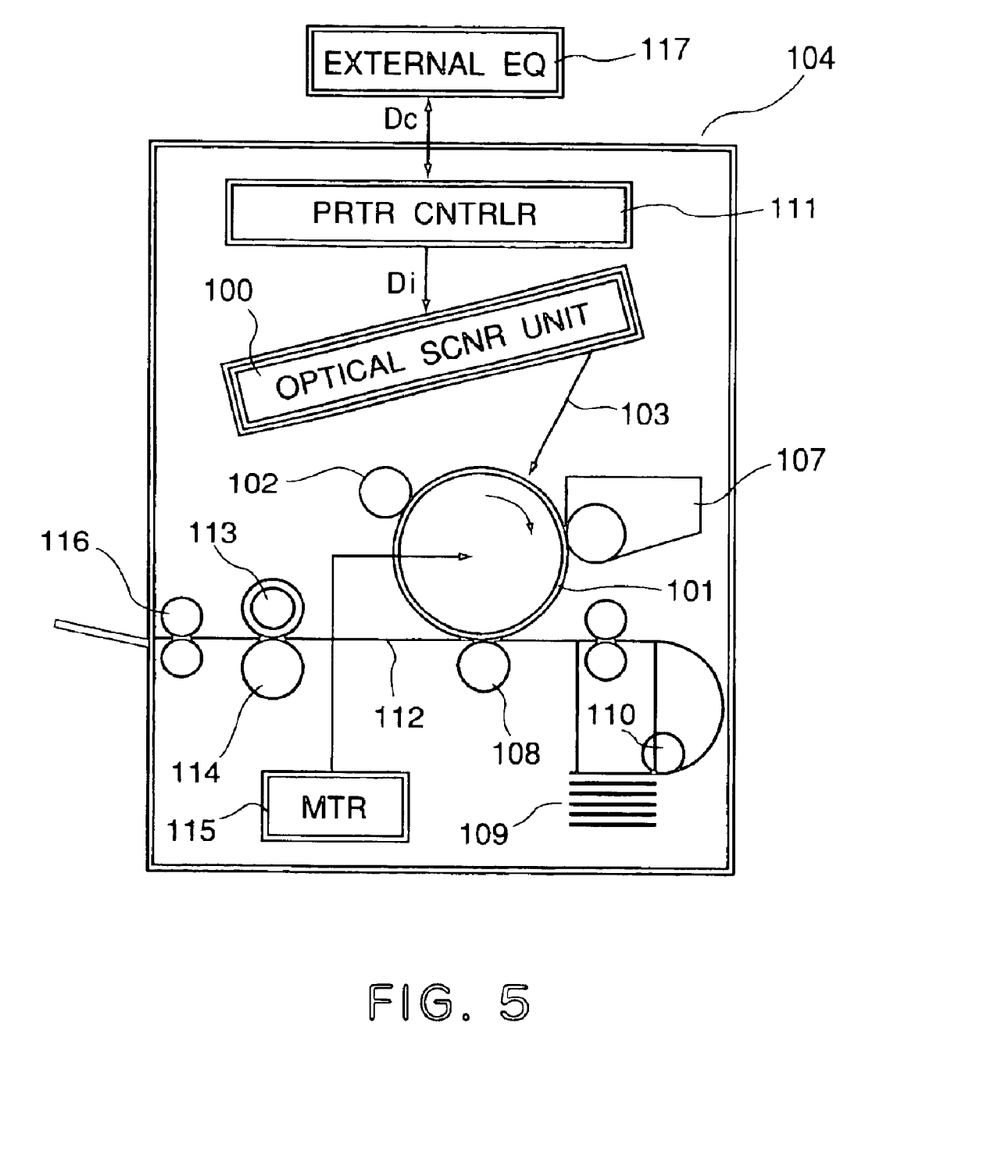
FIG. 5 is a sub-scan section view of an image forming apparatus (electrophotographic printer) using the multi-beam scanning optical system according to an embodiment of the present invention.

FIG. 5 is a sectional view of a major part of an image forming apparatus (electrophotographic printer) according to an embodiment of the present invention, taken in a sub-scan section, said image forming apparatus using the multi-beam light scanning optical system according to Embodiment 1, 2, 3 or 4. In FIG. 5, designated by reference numeral 104 is an image forming apparatus. The image forming apparatus 104 is supplied with a code data Dc from an external equipment such as a personal computer or the like. The code data Dc are converted to image data (dot data) Di by a printer controller 111 in the apparatus. The image data Di is supplied into a light scanning unit 100 having the structures described with the foregoing Embodiments 1, 2, 3 or 4. The light scanning unit (multi-beam light scanning optical system) 100 emits a light beam (beam) 103 ejection which has been modulated in accordance with the image data D1, and the photosensitive surface of the photosensitive drum 101 is scanned with the light beam 103 in the main scan direction.

The photosensitive drum 101 (electrostatic latent image bearing member, or photosensitive member) is rotated in the clockwise direction in the Figure by a motor 115. With the rotation, photosensitive surface of the photosensitive drum 101 moves relative to the light beam 103 in a sub-scan direction which is perpendicular to the main scan direction. Above the photosensitive drum 101, a charging roller 102 is provided, and it is contacted to the surface of the photosensitive drum 101 to uniformly charge the surface of the photosensitive drum 101. The surface of the photosensitive drum 101 electrically charged by the charging roller 102 is exposed to the light beam 103 deflected by the light scanning unit 100.

Since the light beam 103 is modulated in accordance with the image data Di as described above, an electrostatic latent image is formed on the surface of the photosensitive drum 101 by the exposure to the light beam 103. The electrostatic latent image is developed into a toner image by a developing device 107 disposed downstream of the exposure position of the light beam 103 with respect to the rotation of the photosensitive drum 101.

The toner image provided by the developing device 107 is transferred onto a sheet 112 (transfer material) by a transfer roller (transfer device) 108 disposed opposed to the photosensitive drum 101 below the photosensitive drum 101. The sheet 112 is accommodated in a sheet cassette 109 at a front side of the photosensitive drum 101 (righthand side in FIG. 5), but it may be manually fed. At an end of the sheet cassette 109, there is a sheet feeding roller 110 to feed the sheet 112 from the sheet cassette 109 to the feeding path.

The sheet 112 now having te unfixed toner image thereon is fed into a fixing device disposed behind the photosensitive drum 101 (left side in FIG. 5). The fixing device comprises a fixing roller 113 including a fixing heater (unshown) therein, and a pressing roller 114 press-contacted to the fixing roller 113. The sheet 112 fed from the transfer station is pressed and heated in the nip formed between the fixing roller 113 and the pressing roller 114, so that unfixed toner image is fixed on the sheet 112. At the rear side of the fixing roller 113, there are sheet discharging rollers 116 to discharge the sheet 112 on which the toner image is fixed to outside the apparatus.

Although not shown in FIG. 5, the print controller 111 carries out not only the data conversion but also control of various parts in the image forming apparatus such as the motor 115 or the polygonal mirror motor in the light scanning unit 100.

As described in the foregoing, according to the embodiments of the present invention, the aperture stop is disposed at a proper position; principal rays of the multiple light beams emitted from multiple light source means intersect with each other at the position of the aperture stop, so that light beams which are adjacent to each other in the sub-scan direction on the surface to be scanned are the ones emitted from different light source means, by which the clearance between the principal rays on the deflection surface can be decreased, so that generation of the jittering attributable to the defocusing in the main scan direction can be suppressed effectively in the multi-beam light scanning optical system and an image forming apparatus using the same.

In addition, according to the embodiments of the present invention, by selecting the parameters so as to satisfy the condition expression or condition expressions, the deviation of the imaging positions of the light beams can be suppressed to not more than ¼ pixel of the resolution in a multi-beam light scanning optical system and an image forming apparatus using the same. By using an over-field scanning optical system with the multiple light beams synthesized by beam synthesizing means, the position of the aperture stop becomes ideal, so that production of the jittering in the main scan direction attributable to the defocusing can be eliminated in principle, in a multi-beam light scanning optical system and in an application using the same.

While the invention has been described with reference to the structures disclosed herein, it is not confined to the details set forth and this application is intended to cover such modifications or changes as may come within the purpose of the improvements or the scope of the following claims.

What is claimed is:

1. A multi-beam light scanning optical system comprising:
    n (n≧2) light source means having m (m≧2) light emitting points;
    beam synthesizing means for synthesizing n×m light beams emitted by said n light source means;
    deflecting means for deflecting n×m light beams from said beam synthesizing means;
    an imaging optical system for imaging the n×m light beams from said deflecting means on a surface to be scanned,
    wherein the surface to be scanned is scanned in a main scan direction with n×m light beams by a deflection scanning operation of the deflecting means;
    an aperture stop provided between said beam synthesizing means and said deflecting means, wherein principal rays of the n×m light beams are intersected at a position of said aperture stop, and the light beams which are adjacent to each other in a sub-scan direction on the surface to be scanned are the beams emitted from different ones of said n light source means.

2. A multi-beam light scanning optical system according to claim 1, further comprising a coupling lens provided for each of said n light source means, said coupling lens directs the light beams emitted from said m emitting points toward said beam synthesizing means.

3. A multi-beam light scanning optical system according to claim 1, further comprising optical means for converting the n×m light beams to line images extending in the main scan direction on or adjacent a deflection surface of said deflecting means.

4. A multi-beam light scanning optical system according to claim 3, wherein said aperture stop is disposed between said optical means and said deflecting means, and a distance Lh, measured in a direction of an optical axis from said optical means to a light reflection point on the deflection surface of said deflecting means and a distance Lp, measured in the optical direction, from said optical means to said aperture stop, satisfy:

$$Lh/2 < Lp.$$

5. A multi-beam light scanning optical system according to claim 3, wherein a width, measured in the main scan direction, of the n×m light incident on the deflection surface of said deflecting means is larger than a width, measured in the main scan direction, of the deflection surface of said deflecting means.

6. A multi-beam light scanning optical system according to claim 1, wherein a clearance D, measured in the main scan direction, of the emitting point, a focal length $f_{col}$ of said coupling lens, a distance L1 from said aperture stop to the deflection surface of said deflecting means, and a focal length $f_{f\theta}$ measured in the main scan direction, of said imaging optical system, and a recording density DPI, in the main scan direction, on the surface to be scanned, satisfy:

$$(D \times L1)/(f_{col} \times f_{f\theta}) \leq (25.4/DPI) \times (1/4).$$

7. An image forming apparatus comprising a multi-beam light scanning optical system as defined in any one of claims 1 to 5, said apparatus further comprising a photosensitive member disposed at the position of said surface to be scanned, a developing device for developing, into a toner image, an electrostatic latent image formed on said photosensitive member by light rays deflected by said multi-beam light scanning optical system, a transfer device for transferring the toner image onto a transfer material, and a fixing device for fixing the toner image transferred onto the transfer material thereon.

8. An image forming apparatus comprising a multi-beam light scanning optical system as defined in claim 7, said apparatus further comprising a printer controller for converting code data supplied form an external device to an image signal and for supplying the converted data to said multi-beam light scanning optical system.

9. A multi-beam light scanning optical system comprising:
    a first light source means having at least two light emitting points;
    a second light source means having one light emitting point;
    beam synthesizing means for synthesizing at least three light beams emitted by said first and second light source means;
    deflecting means for deflecting three light beams from said beam synthesizing means;
    an imaging optical system for imaging said at least three light beams from said deflecting means on a surface to be scanned,
    wherein the surface to be scanned is scanned in a main scan direction with three light beams by a deflection scanning operation of the deflecting means;
    an aperture stop provided between said beam synthesizing means and said deflecting means, wherein principal rays of said at least three light beams are intersected at a position of said aperture stop, and the light beams which are adjacent to each other in a sub-scan direction on the surface to be scanned are the beams emitted from different ones of said first and second light source means.

10. A multi-beam light scanning optical system according to claim 9, further comprising a coupling lens provided for each of said first and second source means, said coupling lens directs the light beams emitted from said emitting points of said light source means toward said beam synthesizing means.

11. A multi-beam light scanning optical system according to claim 9, further comprising optical means for converting the three light beams to line images extending in the main scan direction on or adjacent a deflection surface of said deflecting means.

12. A multi-beam light scanning optical system according to claim 11, wherein said aperture stop is disposed between said optical means and said deflecting means, and a distance Lh, measured in a direction of an optical axis from said optical means to a light reflection point on the deflection surface of said deflecting means and a distance Lp, measured in the optical direction, from said optical means to said aperture stop, satisfy:

$$Lh/2 < Lp.$$

13. A multi-beam light scanning optical system according to claim 9, wherein a width, measured in the main scan direction, of the n×m light beam incident on the deflection surface of said deflecting means is larger than a width, measured in the main scan direction, of the deflection surface of said deflecting means.

14. A multi-beam light scanning optical system according to claim 9 wherein a clearance D, measured in the main scan direction, of the emitting point, a focal length $f_{col}$ of said coupling lens, a distance L1 from said aperture stop to the deflection surface of said deflecting means, and a focal length $f_{f\theta}$ measured in the main scan direction, of said imaging optical system, and a recording density DPI, in the main scan direction, on the surface to be scanned, satisfy:

$$(D \times L1)/(f_{col} \times f_{f\theta}) \leq (25.4/DPI) \times (1/4).$$

15. An image forming apparatus comprising a multi-beam light scanning optical system as defined in any one of claims 9 to 13, said apparatus further comprising a photosensitive member disposed at the position of said surface to be scanned, a developing device for developing, into a toner image, an electrostatic latent image formed on said photosensitive member by light rays deflected by said multi-beam light scanning optical system, a transfer device for transferring the toner image onto a transfer material, and a fixing device for fixing the toner image transferred onto the transfer material thereon.

16. An image forming apparatus comprising a multi-beam light scanning optical system as defined in claim 15, said apparatus further comprising a printer controller for converting code data supplied form an external device to an image signal and for supplying the converted data to said multi-beam light scanning optical system.

* * * * *

UNITED STATES PATENT AND TRADEMARK OFFICE
CERTIFICATE OF CORRECTION

PATENT NO.    : 6,930,812 B2
DATED         : August 16, 2005
INVENTOR(S)   : Takeshi Yamawaki It is certified that error appears in the above-identified patent and that said Letters Patent is hereby corrected as shown below:

Column 1,
Line 18, "scan in" should read -- scan. In --.

Column 2,
Line 28, "angle $\theta R$." should read -- angle $\theta B$. --.

Column 3,
Line 66, "(8)?" should read -- (8) --.

Column 5,
Line 67, "form" should read -- from --.

Column 6,
Lines 18, 36 and 55, "form" should read -- from --.

Column 7,
Line 37, "a focal" should read -- afocal --; and
Line 55, "((P" should read -- (P --.

Column 8,
Line 34, "arrow An" should read -- arrow A --; and
Line 58, "are emergent without" should read -- without --.

Column 9,
Line 1, "arrow An" should read -- arrow A --; and
Line 34, "Lb," should read -- Lh, --.

Column 10,
Line 1, "h'(D/xf$_{col}$)xL1" should read -- h'(D/f$_{col}$)xL1 --;
Line 5, "h'/f$_{f\theta}$"(DxL1)/f$_{col}$xf$_{f\theta}$)" should read -- h'/f$_{f\theta}$(DxL1)/f$_{col}$xf$_{f\theta}$) --; and
Line 63, "surface 1a" should read -- surface 10a --.

UNITED STATES PATENT AND TRADEMARK OFFICE
CERTIFICATE OF CORRECTION

PATENT NO. : 6,930,812 B2
DATED : August 16, 2005
INVENTOR(S) : Takeshi Yamawaki It is certified that error appears in the above-identified patent and that said Letters Patent is hereby corrected as shown below:

<u>Column 12,</u>
Line 9, "data D1," should read -- data Di, --; and
Line 42, "te" should read -- the --.

<u>Column 14,</u>
Line 29, "form" should read -- from --.

<u>Column 16,</u>
Line 20, "form" should read -- from --.

Signed and Sealed this

Eleventh Day of April, 2006

JON W. DUDAS
*Director of the United States Patent and Trademark Office*